(12) United States Patent
Franzrahe et al.

(10) Patent No.: US 12,102,976 B2
(45) Date of Patent: Oct. 1, 2024

(54) PLANTS AND SYSTEMS FOR PRODUCING FERTILIZER GRANULES WITH A DEFINED SIZE DISTRIBUTION

(71) Applicants: thyssenkrupp Fertilizer Technology GmbH, Dortmund (DE); thyssenkrupp AG, Essen (DE)

(72) Inventors: Harald Franzrahe, Dortmund (DE); Thomas Krawczyk, Wuppertal (DE)

(73) Assignees: thyssenkrupp Fertilizer Technology GmbH, Dortmund (DE); thyssenkrupp AG, Essen (DE)

( * ) Notice: Subject to any disclaimer, the term of this patent is extended or adjusted under 35 U.S.C. 154(b) by 289 days.

(21) Appl. No.: 17/587,828

(22) Filed: Jan. 28, 2022

(65) Prior Publication Data

US 2022/0143566 A1    May 12, 2022

Related U.S. Application Data

(62) Division of application No. 16/459,935, filed on Jul. 2, 2019, now abandoned.

(30) Foreign Application Priority Data

Jul. 13, 2018  (EP) .................... 18 183 433

(51) Int. Cl.
  *B01J 2/16* (2006.01)
  *B01J 8/00* (2006.01)
  (Continued)

(52) U.S. Cl.
  CPC ............. *B01J 2/16* (2013.01); *B01J 8/0015* (2013.01); *B01J 8/1809* (2013.01); *B01J 8/1872* (2013.01); *C05C 9/005* (2013.01); *C05G 5/12* (2020.02)

(58) Field of Classification Search
  CPC . B01J 2/16; B01J 8/0015; B01J 8/1809; B01J 8/1872; C05G 5/12; C05G 9/005
  (Continued)

(56) References Cited

U.S. PATENT DOCUMENTS 3,398,191 A * 8/1968 Beaumont ................ C05C 1/02
                                                       71/64.12
3,516,813 A * 6/1970 Smith ........................ B01J 2/12
                                                       23/313 R
(Continued)

FOREIGN PATENT DOCUMENTS

CA    3048236 A1 * 1/2020 ............. B01J 2/00
DE    31 16 778 A    2/1982
(Continued)

OTHER PUBLICATIONS

Meessen et al., Urea. Ullmann's Encyclopedia of Industrial Chemistry, (2012).
(Continued)

*Primary Examiner* — Terrell H Matthews
(74) *Attorney, Agent, or Firm* — thyssenkrupp North America, LLC

(57) ABSTRACT

A fluid-bed granulator system for producing fertilizer granules with a defined size including a fluid-bed granulator, a first cooler externally connected with the fluid-bed granulator or forming an internal part of the fluid-bed granulator, and a product screen connected with the first cooler. The product screen includes an exit for on-size particles; an exit for oversized particles and an exit for undersized particles. The exit for undersized particles is connected to the fluid-bed granulator and the exit for oversized particles is connected to the fluid-bed granulator via one or more crushers. The exit for on-size particles is connected to a first splitter. The first splitter is connected to the fluid-bed granulator and
(Continued)

a post processing unit. A particle size analyzer is located between the fluid-bed granulator and the product screen.

21 Claims, 6 Drawing Sheets

(51) Int. Cl.
*B01J 8/18* (2006.01)
*C05C 9/00* (2006.01)
*C05G 5/12* (2020.01)

(58) Field of Classification Search
USPC .......................................................... 209/391
See application file for complete search history.

(56) References Cited

U.S. PATENT DOCUMENTS

| | | | |
|---|---|---|---|
| 4,219,589 A | 8/1980 | Goethals | |
| 4,701,353 A | 10/1987 | Mutsers | |
| 4,842,790 A | 6/1989 | Nunnelly | |
| 5,779,945 A * | 7/1998 | Nijsten | C05G 5/30 |
| | | | 264/117 |
| 6,179,893 B1 * | 1/2001 | Bendix | C05C 3/00 |
| | | | 71/30 |
| 7,029,504 B2 * | 4/2006 | Rabie | C01C 1/18 |
| | | | 423/397 |
| 9,527,104 B2 | 12/2016 | Ledoux | |

| | | | |
|---|---|---|---|
| 2002/0011088 A1 | 1/2002 | Peacock et al. | |
| 2011/0159084 A1 * | 6/2011 | Alagarsamy | A61P 5/32 |
| | | | 424/452 |

FOREIGN PATENT DOCUMENTS

| | | | | |
|---|---|---|---|---|
| EP | 0026918 A1 * | 10/1980 | | |
| EP | 0 026 918 B | 4/1981 | | |
| EP | 0 212 714 A | 3/1987 | | |
| EP | 2253374 A1 * | 11/2010 | | B01J 2/16 |
| EP | 2 305 371 A | 4/2011 | | |
| GB | 1462633 A | 1/1977 | | |
| SU | 1728232 A | 4/1992 | | |
| WO | 01/43861 A | 6/2001 | | |
| WO | 2005/032696 A | 4/2005 | | |
| WO | 2010/060535 A | 6/2010 | | |
| WO | 2012/113473 A | 8/2012 | | |
| WO | WO-2019215193 A1 * | 11/2019 | | B01J 2/16 |

OTHER PUBLICATIONS

Outotec Automation Solutions for Grinding Optimization, (2017).
Haver & Boecker. Haver CPA 2-1. New Software and Innovative Interface. Economical State-of-the Art Unit for Use in a Laboratory Environement, (Accessed Dec. 18, 2017).
Microtrac MRB, "Using on-line image analysis to control the fertilizer manufacturing process" <https://www.azom.com/article.aspx?ArticleID=14089> Jun. 12, 2017 (Year: 2017).
JH Equipment. "J&H Mod III Triple Deck Screening Machine". <http://www.jhequipment.com/products/screen-machine/triple-deck-screening/> Apr. 28, 2017 (Year: 2017).

* cited by examiner

PLANTS AND SYSTEMS FOR PRODUCING FERTILIZER GRANULES WITH A DEFINED SIZE DISTRIBUTION

CROSS-REFERENCE TO RELATED APPLICATIONS

This application is a divisional of U.S. patent application Ser. No. 16/459,935, which was filed Jul. 2, 2019, which in turn claims priority to European Patent Application No. EP 18 183 433.4, which was filed Jul. 13, 2018, the entire contents of both of which are hereby incorporated by reference herein.

FIELD

The present disclosure generally relates to a fluid-bed granulator system for producing fertilizer granules with a defined size.

BACKGROUND

Due to a continuous world population growth, there is an ongoing need in providing reliable, easy producible and cheap fertilizers. These conventional fertilizers may contain nitrogen, phosphate, sulfur, potassium or micronutrients.

A common, widely used fertilizer contains urea as its main component. The water-soluble urea rapidly decomposes in the soil, providing ammonia and nitrate compounds. Based on the application, the fertilizer may contain only urea or a combination of urea with one or more of the before mentioned components, e.g. phosphate, sulfur, potassium or micronutrients.

Urea can be produced on a large industrial scale by reacting ammonia with carbon dioxide via a (simplified) two-step reaction (e.g. in ULLMANN'S Encyclopedia of Industrial Chemistry, DOI: 10.1002/14356007):

$$2NH_3 + CO_2 \rightleftharpoons H_2N\text{—}COONH_4 \quad (1)$$

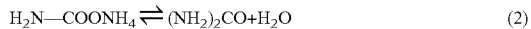
$$H_2N\text{—}COONH_4 \rightleftharpoons (NH_2)_2CO + H_2O \quad (2)$$

Post synthesis process steps are necessary in order to provide a transportable and storable urea fertilizer. Common technical processes include diverse granulation technics like prilling, drum granulation or fluid-bed granulation. Especially prilling processes suffer from some critical drawbacks like relatively soft particles and sometimes deformed inhomogeneous particles.

These problems can be avoided by using a fluid-bed granulation process, which results in harder, more stable and homogeneous granules. The resulting granular urea is particularly suitable for bulk blending operations. Furthermore, there is reduced segregation or mechanical damage during mixing and transporting of the urea-based fertilizer.

Examples of fluid-bed granulation process of urea can be found in WO 2010/060535 A1, e.g. in paragraphs [0025]-[0035], FIG. 1 or in U.S. Pat. No. 4,701,353 A, DE 31 16 778 A1 and U.S. Pat. No. 4,219,589 A.

The fluid-bed granulation process is based on providing granulation seeds, which grow by absorbing very small droplets of a growth liquid. These small droplets can be provided via an "atomized" liquid urea melt. The term "atomized" used in the description refers to a mixing process of the liquid urea melt (or other suitable fertilizer melts) with a pressurized medium like air. This mixing process creates a liquid/gas emulsion or an aerosol of small droplets. The term "atomized" should therefore not be confused with a molecular separating process of atomic/covalent bonds. The produced droplets may have a medium size distribution around 1 μm to 200 μm. These small melt droplets accumulate and solidify on the surface of the granulation seeds, thereby increasing the size of the granulation particles. These fresh "in-situ" produced granules may commonly exhibit temperatures around 100° C. and are relatively soft. The particles further cool down in the fluid-bed of the granulator and/or in separate cooling equipment.

The increased use of mechanical spreading systems in combination with precision farming techniques leads to ever more stringent requirements for the size distribution of granular fertilizers. Previously a typical size distribution would be 90% between 2-4 mm and 1% below 1 mm. Nowadays a typical size distribution are 95% between 2-4 mm, plus additional requirements such as 60% over 2.8 mm, or specific values for the SGN (size guide number) and UI (uniformity index).

The growth rate in a typical fluid bed granulation plant cannot be controlled precisely enough to produce such uniform size distributions. Therefore, increasing efforts are required to understand and control the size distribution produced in the granulator.

One such solution could be to provide more and better screening sections to screen off unwanted granule sizes. This however causes additional investment for equipment and building and produces more "off spec" (particle properties outside the product specification/insufficient product quality) product which must be recycled; at the same time the production rate is reduced. While significant efforts have been made to optimize screens and screen mesh sizes a continuous production of the high-quality size grades remains difficult.

U.S. Pat. No. 9,527,104 B2 discloses a method for processing of granules wherein the fluidized bed comprises a classifier.

GB 1,462,633 A discloses a process for granulating urea using cooling procedures before or after classification.

EP 0 212 714 A1 discloses a process for the preparation of granules wherein the undersized particles are returned to the granulation zone and the oversized particles are stored in a buffer vessel. Subsequently the oversized particles are returned to the granulation zone after size reduction.

EP 2 305 371 A1 discloses a process for producing granules with a particle size distribution characterized by a standard deviation less than 15% of the mean particle size.

U.S. Pat. No. 3,516,813 A discloses a method for producing more uniform product size fertilizer pellets by suppressing the percentage of smaller intermediate size granules.

EP 0 026 918 B1 discloses a spouted bed granulation process comprising seed particle optimization.

WO 01/43861 A1 discloses a classifying fluid-bed granulator. The granulation chamber is divided into an agglomeration and seed control section and a granulation and classification section.

WO 2012/113473 A1 discloses a process for preparation of a granular urea product by granulating a urea solution in a fluidized bed, where said urea solution enters the fluidized bed by means of several urea inputs.

Thus, a need exists for a fluid-bed granulator system with an increased output of size-controlled particles with a decreased size distribution.

DETAILED DESCRIPTION

Figure 1:
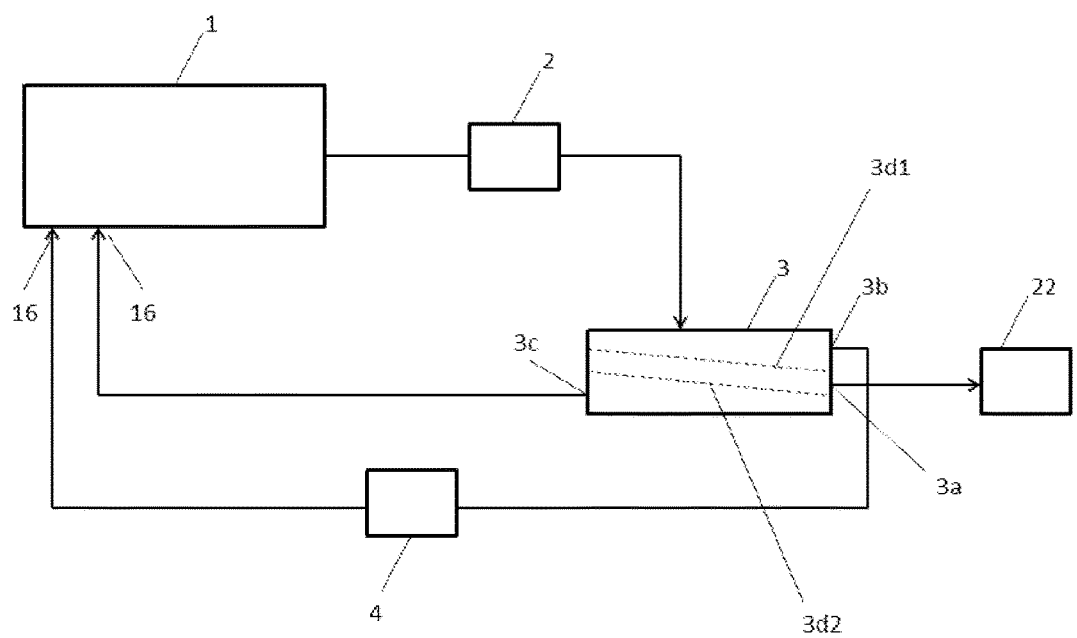
FIG. 1 is a schematic view of a fluid-bed granulator system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a fluid-bed granulator system for producing fertilizer granules with a defined size, a process for a particle size-controlled granulation of urea containing particles, a urea granulation plant and the use of the fluid-bed granulator system for the production of fertilizer granules containing ammonia compounds.

The problems disclosed in the prior art can be solved by a process for a particle size-controlled granulation of urea containing particles.

Another solution to the problems disclosed in the prior art is the provision of a plant for the production of urea containing fertilizer granules.

Another need exists to provide the use of the urea granulation plant for the production of fertilizer granules.

The fluid-bed granulator system for producing fertilizer granules with a defined size at least comprises a fluid-bed granulator and a first cooler externally connected with the fluid-bed granulator or forming an internal part of the fluid-bed granulator. The term "connected" within the meaning of the invention generally refers to connection means which are able/suitable to transport or transfer process liquids, solids or gases, e.g. via pipes, ducts, pumps, hoses and further includes tanks, reservoirs and/or pumps. This definition includes connection means suitable for low pressure gaseous, solid and liquid mediums (below 1 bar) and high pressure (above 1 bar) gaseous, solid and liquid mediums. The term "connected" within the meaning of the invention includes a connection via further additional (including not mentioned) devices located (and connected) between the respective connected devices.

In addition, a product screen is connected (downstream of the first cooler) with the first cooler. The product screen (or sieve or screen mesh) separates the granular particles from the product cooler into on-size product particles within the desired product size) and into oversized (above the desired product size) and undersized (below the desired product size) particles. This particle size separation and selection can be achieved e.g. by the use of different screen meshes (within the product screen) with a decreasing mesh size. Preferably, a minimum screen setup (in the direction of flow/top to bottom) would include a first screen mesh with a mesh size above the desired particle size and a second screen mesh with a mesh size below the desired particle size, thus dividing the product screen into three parts. Within the meaning of the invention, the term "above the desired particle size" preferably refers to mesh size slightly above the upper limit of the desired particle size (e.g. above 4 mm) and below the lower limit of the oversized particles. The actual mesh size may therefore vary e.g. in a range of 5% to 25% in dependence of the before mentioned particle size. Within the meaning of the invention, the term "below the desired particle size" preferably refers to mesh size slightly below the lower limit of the desired particle size (e.g. below 2 mm) and above the upper limit of the undersized particles. The actual mesh size may therefore vary e.g. in a range of 5% to 25% in dependence of the before mentioned particle size. The product screen further comprises an exit for oversized particles, e.g. above the first screen mesh, and an exit for undersized particles, e.g. below the second screen mesh. The exit for the undersized particles is connected to the fluid-bed granulator and the exit for oversized particles is connected to the granulator via a crusher or a similar device. The undersized particles and/or crushed oversized particles act as seed particles in the fluid-bed granulator. Within the meaning of the invention, the term "crusher" includes comminution devices for crushing, grinding, milling, cutting, vibrating and/or breaking, e.g. crushers or mills. According to the invention the product screen further comprises an exit for on-size particles, preferably with a medium particle diameter between 2 mm and 4 mm.

In addition, the exit for the on-size particles is connected to a first splitter and wherein the (exit of the) first splitter is simultaneously connected with the fluid-bed granulator and a post processing unit. The term "splitter" includes devices (like e.g. valves or switches) allowing a changeable flow of the particles to different parts of the processing parts. The first splitter allows an adjustable reuse of the on-size particles as seed particles in the fluid-bed granulator. Within the meaning of the invention the term "adjustable" includes devices for manually, pneumatically and/or electronically (including automatically) controlling the splitter, thereby varying the amount of on-size particles passing the splitter and entering the fluid-bed granulator. Depending on the particle size distribution of the granular particles leaving the fluid-bed granulator, the splitter allows a reuse of larger (in comparison to the undersized or crushed particles) on-size particles as seed particles in the fluid-bed granulator or a conveying of these particles into the post processing unit. The splitter allows a distribution and regulation of the particle stream originating from the exit for on-sized particles towards the recycle inlets of the fluid-bed granulator and/or the post processing unit. The term "post processing unit" includes well known devices for, weighing, transporting and packaging of the final product particles.

Figure 5:
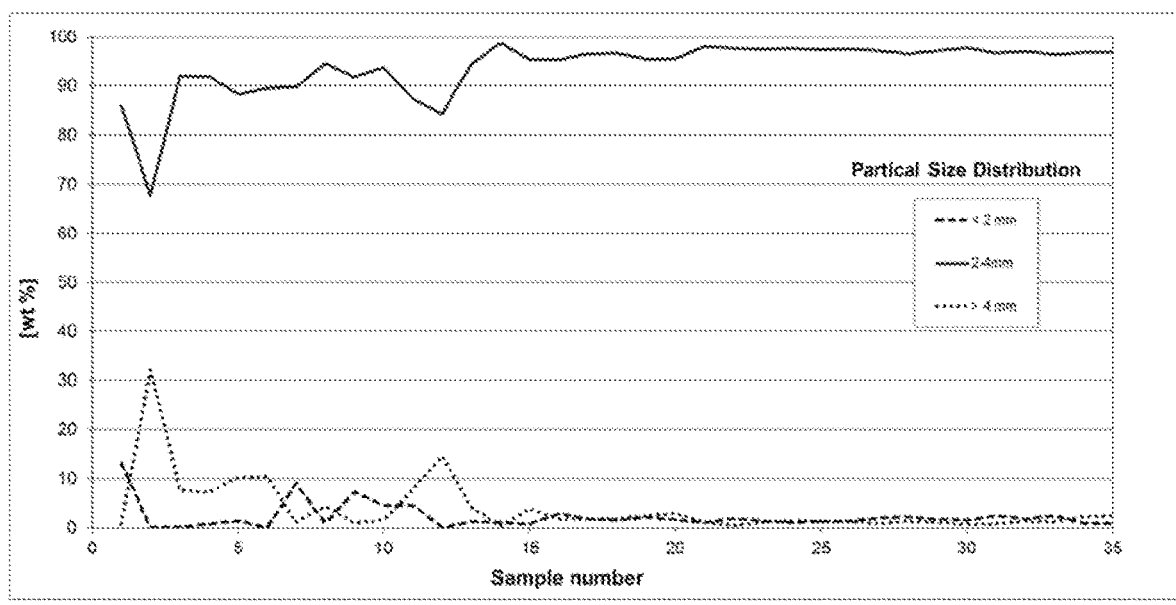
FIG. 5 is a diagram of an experimental particle size distribution.

According to the invention a particle size analyzer is located between the fluid-bed granulator and the product screen. The particle size analyzer is able to determine the particle size of the product particles leaving the fluid-bed granulator. Examples of (online) particle size analyzers are well known in the art, e.g. an online particle size analyzer (e.g. HAVER CPA 2-1, Outotec RockSense®). The output of the online particle analyzer is then preferably used by an advanced process control system (APC) which independently controls the granule size distribution in the product particles. This seed particle size adjustment surprisingly dampens the oscillations in the recycle and product flows which often occur in granulation plants, after a process change or upset. These oscillations can lead to significant disturbances in the plant operation and in the size distribution of the product. Without the oscillations of the flows the plant operation and the product quality are significantly improved. Depending on the size of the product granules leaving the granulator or the first cooler, either more/less (larger) on-size particles or undersized and crushed oversized particles can be used as seed granules in granulator. This seed particle size adjustment surprisingly lowers the otherwise occurring wave-like particle size fluctuations. The effect of this 'dampening' of the product size distributions is shown in FIG. 5

Preferably the product screen further comprises an exit for large on-size particles and small one-size particles. The term "large on-size particles" and "small on-size particles" refer to particles within the size range of "on-size" final product particles, e.g. preferably with a medium particle diameter between 2 mm and 4 mm. This setup can be e.g. realized by utilizing a third screen mesh between the above mentioned first screen mesh and second screen mesh. This third screen mesh separates the on-size particles into large on-size particles with particle sizes above the mesh size of the third screen mesh (and below the first screen mesh) and into small on-size particles below the mesh size of the third screen mesh (and above the mesh size of the second screen mesh). In addition, the exit for large on-size particles and the exit for small on size particles are connected to the first splitter and wherein the first splitter is simultaneously connected with the fluid-bed granulator and a post processing unit. This preferred setup allows a further "fine tuning" of the product granule size by further varying the size of the seed granules.

Preferably, the product screen comprises (from top to bottom) three inner screen meshes with a decreasing mesh size. If required, the product screen can comprise (from top to bottom) three, four or five inner screen meshes. These screen meshes may be connected to a third, fourth or fifth (and so on) splitter. By this way different product size distributions can be produced simultaneously Preferably, the mesh size of the inner screen meshes is in the range of 0.1 mm to 10 mm, preferably in the range of 1 mm to 5 mm.

Preferably, the first splitter and/or the exit for oversized particles via the crusher and/or the exit for undersized particles are connected to (preferably the input of) a second splitter. The (preferably output of the) second splitter is connected to the recycle inlets of the fluid-bed granulator. The splitter allows a distribution and regulation of the particle streams originating from the first splitter and/or the exit for oversized particles via the crusher and/or the exit for undersized particles towards the recycle inlets of the fluid-bed granulator.

More preferably the particle size analyzer is (electronically) connected with the first splitter and/or the second splitter. Even more preferably the particle size analyzer is electronically connected with the first and/or second splitter via a processing and control unit. This connection setup allows an online measuring and simultaneous, preferably an automated, adjusting of the product particle size within the fluid-bed granulator via the size of the introduced seed particles provided (released) by the first splitter and/or second splitter.

Preferably, the Fluid-bed granulator comprises a granulator space inside the fluid-bed granulator. The fluid-bed granulator further comprises a perforated plate located inside the granulator space and spray nozzles located in, on or beside the perforated plate. Preferably, the spray nozzles are attached to the perforated plate. A fluidization air inlet, preferably located below the perforated plate, provides the necessary fluidization air for the fluid bed of fertilizer granules. The term "fluidization air" includes air or inert gases like $CO_2$, nitrogen, argon or mixtures thereof. The spray nozzles are connected to supply lines for atomization air and supply lines for a liquid melt, preferably a liquid melt containing urea. Within the meaning of the invention, the term "melt" includes salt melts and concentrated salt solution and mixtures thereof, preferably solutions containing more than 50 wt. % salt. Optionally, these supply lines for air and melt can be combined in one line. In addition, the fluid-bed granulator comprises a granulation seeds inlet. The term "a granulation seeds inlet" comprises internal and external devices, lines and openings for the introduction of granular seeds. The term "internal" refers to the production of granular seeds within the granulator. The term "external" refers to the providing provision or production of granular seeds from outside the granulator, e.g. via sieves or crushers outside the fluid-bed granulator. Furthermore, the fluid-bed granulator comprises a granulator outlet opening and an air vent opening. Optionally, the granulator space comprises separating walls with optionally integrated openings. These separating walls may further alter and modify the speed of the fluid bed towards the granulator outlet opening. Dust, e.g. urea dust, and chemical vapors like ammonia, which are created or released during the granulation process, are removed in a separate scrubber unit. Preferably, the scrubber unit comprises at least a dust removing scrubber and an ammonia removing scrubber. Examples of suitable scrubbers can be found in WO 2005/032696 A1 (FIG. 1) or WO2010/60535 A1.

Preferably, the first fluid-bed cooler comprises at least a cooler space inside the fluid-bed cooler and a perforated plate located inside the cooler space. A fluidization air inlet, preferably located below the perforated plate, provides the necessary fluidization air for the fluid bed of fertilizer granules. The fertilizer granules are conveyed into the cooler via a product inlet. The cooled fertilizer granules leave the fluid-bed cooler via a cooler outlet opening. Furthermore, the fluid-bed cooler comprises an air vent opening. Dust, e.g. urea dust, and chemical vapors like ammonia, which are created or released during the cooling process, are removed in a separate scrubber unit via the air vent opening. Preferably, the scrubber unit comprises at least a dust removing scrubber. In a preferred embodiment, the recycle cooler uses air or water as cooling medium.

Preferably, the perforated plate comprises (in the direction of the granular flow) at least a growing zone and a cooling zone, more preferably (in the direction of flow) at least a first growing zone, a first cooling zone, a second growing zone and a second cooling zone. The term "growing zone" refers to a section of the perforated plate inside the fluid-bed granulator. The growing zone marks a section, wherein the particle size and weight is increased, e.g. due absorbing urea droplets (released from the spraying nozzles). The term "cooling zone" refers to another section of the perforated plate inside the fluid-bed granulator. The cooling zone marks a section, wherein the particle size and weight is kept relatively constant (besides temperature related shrinking effects) and wherein the temperature of the particles is reduced. The combination of cooling and growing zones supports the temperature control of the fluid-bed and helps to prevent the overheating of the particles. Preferably, the cooling zone does not comprise spray nozzles.

Preferably, the (output of the) first splitter and/or the (output of the) second splitter are connected to the growing zone and/or the cooling zone via recycle inlets. Even more preferably the first splitter and/or the second splitter are connected to the first growing zone and/or the second growing zone via the recycle inlets. The distribution of the seed particles originating from the first and/or second splitter allows an even finer particle size adjustment.

In a preferred embodiment of the invention the first splitter and/or the second splitter are electronically connected with a processing and control unit. In addition, the processing and control unit is electronically connected with the particle size analyzer. This setup allows an automated regulation (APC advanced process control) of the product granules size, preferably without any manual intervention or regulation.

Preferably, the (more preferably input of the) second splitter is connected to the (preferably output) of the first splitter and/or the exit for oversized particles via the crusher and/or the exit for undersized particles. In addition, the (preferably output of the) second splitter is connected to the recycle inlets of the fluid-bed granulator and wherein the recycle inlets are connected to one or more growing zones and/or cooling zones.

Preferably the product screen (or sieve) comprises four inner screen meshes with a decreasing mesh size or five inner screen meshes with a decreasing mesh size.

Preferably the product screen is connected to a third splitter and/or a fourth splitter. Simultaneously the third splitter and/or the fourth splitter are connected to the fluid-bed granulator and the post processing unit. Even more preferably the third splitter and/or a fourth splitter are controlled via the processing and control unit.

The invention further comprises a process for a particle size-controlled granulation of urea containing particles at least comprising the following steps. In a first step, seed granules are conveyed into a fluid-bed granulator. The seed granules are processed (granulated) in the fluid-bed granulator and transferred into product granules. The said product granules are conveyed to a first cooler. The first cooler can be externally connected with the fluid-bed granulator or form an internal part of the fluid-bed granulator. Follow-up, pre-cooled product granules are received.

The said pre-cooled product granules are conveyed into a product screen comprising an exit for on-size particles, an exit for oversized particles and an exit for undersized particles. The exit for on-size particles is connected to a splitter. The splitter is further connected with the fluid-bed granulator and a post processing unit. Follow-up, the undersized particles are conveyed into the fluid-bed granulator, the on-size particles are conveyed into the post processing unit and the oversized particles are conveyed into a crusher. The crusher provides crushed particles, which are conveyed back into the fluid-bed granulator. The on-size particles are conveyed to the fluid-bed granulator and/or the post processing unit via the splitter.

The inventive process is characterized in that the size of the product granules or pre-cooled product granules is measured by a particle size analyzer and the obtained product granules size or pre-cooled product granules size is compared to a predefined "threshold" value. Preferably, this predefined "threshold" value defines a lower particle size threshold value. The amount of on-size particles conveyed to the fluid-bed granulator is increased, if the size of the product granules drops below the predefined value. Within the meaning of the invention, the term "drops below" may include a suitable delay time before actually increasing the amount of large on-size particles. Within the meaning of the invention, the term "the amount of on-size particles conveyed to the fluid-bed granulator is increased" includes an increase based on zero conveyed on-size particles if the before measured sizes of the product granules or pre-cooled product granules were above the predefined "threshold" value.

Preferably, the product screen comprises (from top to bottom) three inner screen meshes with a decreasing mesh size. The third middle screen mesh separates the on-size particles into large on-size particles with particle sizes above the mesh size of the third screen mesh (and below the first screen) and into small on-size particles below the mesh size of the third screen mesh (and above the mesh size of the second screen mesh). In addition, the exit for large on-size particles and the exit for small on size particles are connected with a first splitter and wherein the first splitter is simultaneously connected with the fluid-bed granulator and a post processing unit. This preferred setup allows a further "fine tuning" of the product granule size by further varying the size of the seed granules.

More preferably the particle size analyzer is electronically connected with the splitter and/or the first splitter and/or the second splitter. Even more preferably the particle size analyzer is electronically connected with the splitter via a processing and control unit. This connection setup allows an online measuring and simultaneous, preferably an automated, adjusting of the product particle size within the fluid-bed granulator via the size of the introduced seed particles based on the large on-size particles. Simultaneously, the seed particles and/or a part of the seed particles are provided via the before described splitter.

In a preferred embodiment, the size of the product granules or pre-cooled product granules is measured by the particle size analyzer and the obtained product granules size or pre-cooled product granules size is compared to a second predefined value. The second predefined value defines an upper particle size threshold value and the amount of undersized particles and/or crushed particles is increased, if the size of the product granules drops above the predefined second value. The "use" of a second predefined threshold value allows an automated control of the product particle size, by increasing the amount of on-size particles if the product particle size decreases. On the other hand, by increasing the amount of undersized particles and/or crushed particles an increase of the product particle size can be corrected. Preferably, the before mentioned steps are controlled and regulated by a suitable computer program and corresponding hardware.

Preferably the undersized particles and/or crushed particles and/or on-size particles are introduced via recycle inlets into one or more growing zone(s) and/or cooling zone(s). The term "growing zone" refers to a section of the perforated plate inside the fluid-bed granulator. The growing zone marks a section, wherein the particle size and weight is increased, e.g. due absorbing urea droplets. The term "cooling zone" refers to another section of the perforated plate inside the fluid-bed granulator. The cooling zone marks a section, wherein the particle size and weight are kept relatively constant and wherein the temperature of the particles is reduced. The combination of cooling and growing zones supports the temperature control of the fluid-bed and helps to prevent the overheating of the particles. Preferably, the cooling zone does not comprise spray nozzles.

The invention further comprises a urea granulation plant comprising an inventive fluid-bed granulator system as described above.

The invention further comprises an inventive fluid-bed granulator system as previously described for the production of fertilizer granules containing ammonia compounds, nitrates, phosphates, urea, elemental sulfur, ammonia sulfate, UAS (urea-ammonia sulfate), granulation additives, phase mixing additives, micronutrients and/or mixtures thereof. The term "granulation additives" comprises formaldehyde or formaldehyde free granulation additives like a combination of at least one amino-group containing polymer or oligomer and at least one functional polyvinyl compound, preferably a combination of polyethylene imine and polyvinyl alcohol, a compound selected from the group of aliphatic dicarboxylic acids and anhydrides, aliphatic tricarboxylic acids and anhydrides, aromatic Dicarboxylic acids and anhydrides, and/or aliphatic $C_2$-$C_8$ dialdehyde. The term "phase mixing" additives comprises anionic, cationic or non-ionic surfactants, more preferably salts and ester of fatty acids, SDS (Sodium dodecylsulfate), AOT (Dioctyl sodium sulfosuccinate), lignin(e) and/or lignin(e) sulfonate and/or mixtures or derivates thereof.

FIG. 1 shows an exemplary schematic view of a fluid-bed granulator system. The fluid-bed granulator system comprises a fluid-bed granulator (1) and a first cooler (2) connected with the fluid-bed granulator (1). The term "connected" within the meaning of the invention generally refers to connection means which are able/suitable to transport or transfer process liquids or gases, e.g. pipes, ducts, pumps, hoses and further includes tanks, reservoirs and/or pumps. This definition includes connection means suitable for low pressure gaseous and liquid mediums (below 1 bar) and high pressure (above 1 bar, preferably above 10 bar) gaseous and liquid mediums. A product screen (3) is connected to the first cooler (2). The product screen (3) (or sieve) separates the granular particles from the product cooler into product particles (3a) within the desired product size and into oversized (above the desired product size) particles (3b) and undersized (below the desired product size) particles (3c). The minimum screen (3) setup would include a first screen mesh (3d1) with a mesh size above the desired particle size and a second screen mesh (3d2) below the desired particle size, thus dividing the product screen into three parts. The product screen further comprises an exit for final product particles (3a), e.g. between the first screen mesh and second screen mesh, an exit for oversized particles (3b), e.g. above the first screen mesh, and an exit for undersized particles (3c), e.g. below the second screen mesh. The exit for the undersized particles (3a) is connected via the recycle inlet (16) with the fluid-bed granulator (1) and the exit for oversized particles (3b) is connected to the granulator (1) via a crusher (4) or a similar device, resulting in crushed particles (3d). The final product particles (3a) are transferred to suitable further post processing units (22) like scales and packaging devices.

Figure 2:
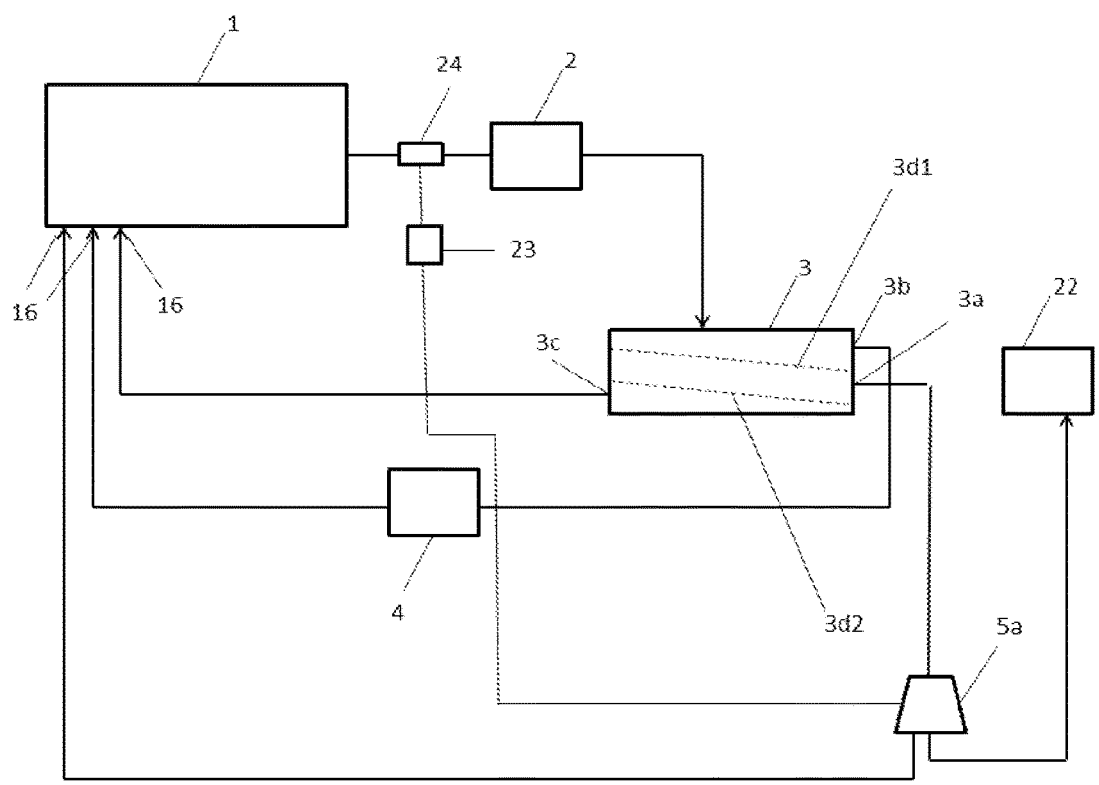
FIG. 2 is a schematic view of a fluid-bed granulator system.

FIG. 2 shows a schematic view of the fluid-bed granulator system according to the invention. The principle setup is identical with the setup described in FIG. 1. The product screen (3) (or sieve) separates the granular particles from the product cooler (2) into product particles within the desired product size (on-size) and into oversized (above the desired product size) and undersized (below the desired product size) particles. This includes a first screen mesh (3d1) with a mesh size above the desired particle size and a second screen mesh (3d2) below the desired particle size, thus dividing the product screen into three parts. The product screen (3) further comprises an exit for oversized particles (3b), e.g. above the first screen mesh, and an exit for undersized particles (3c), e.g. below the second screen mesh (3d2). The exit for the undersized particles (3c) is connected to the fluid-bed granulator (1) and the exit for oversized particles (3b) is connected to the fluid-bed granulator (1) via a crusher (4) or a similar device. In addition, the exit for on-size particles (3a) is connected to a first splitter (5a). The first splitter (5a) is connected to the fluid-bed granulator (1) and the post processing unit (22). The first splitter (5a) allows an adjustable reuse of on-size particles (3aL) in the fluid-bed granulator. Within the meaning of the invention the term "adjustable" includes devices for manually or electronically controlling the splitter, thereby varying the amount of on-size (3a) particles passing the first splitter (5a) and entering the fluid-bed granulator (1). Depending on the particle size distribution of the granular particles leaving the fluid-bed granulator, the first splitter (5a) allows a reuse of on-size particles (3a) or a conveying of these on-size particles (3a) into the post processing unit. A particle size analyzer (24) is located between the fluid-bed granulator (1) and the product screen (3). The particle size analyzer (24) is able to determine the particle size of the product particles leaving the fluid-bed granulator (1). Examples of (online) particle size analyzers are well known in the art, e.g. an online particle size analyzer (HAVER CPA 2-1, Outotec RockSense®). The output of the online particle analyzer is then used by a processing and control unit (23) which may independently (APC-advanced process control) control and adjust the granule size distribution in the product particles. The particle size analyzer (15) is electronically connected with the first splitter (5a) via the processing and control unit (23). This connection setup allows an online measuring and simultaneous, preferably an automated, adjusting of the product particle size within the fluid-bed granulator via the size of the introduced seed particles.

Figure 3:
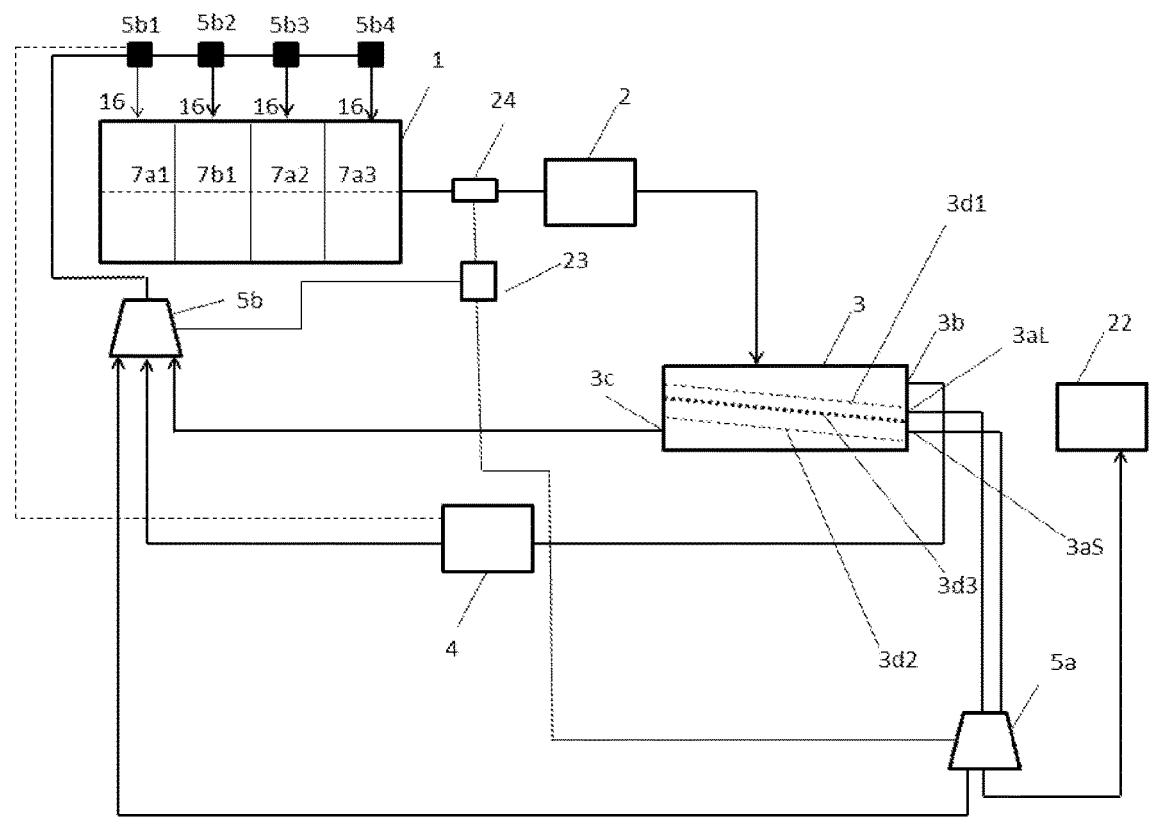
FIG. 3 is a schematic view of a preferred embodiment of the fluid-bed granulator system.

FIG. 3 shows a schematic view of a preferred embodiment of the fluid-bed granulator system according to the invention. The principle setup is identical with the setup described in FIG. 2. The product screen (3) further comprises an exit for large on-size particles (3aL) and small one-size particles (3aS). The term "large on-size particles" and "small on-size particles" refer to particles within the size range of "on-size" final product particles, e.g. preferably with a medium particle diameter between 2 mm and 4 mm. This setup is realized by utilizing a third screen mesh (3d3) between the above mentioned first screen mesh (3d1) and second screen mesh (3d2). This third screen mesh (3d3) separates the on-size particles into large on-size particles (3aL) with particle sizes above the mesh size of the third screen mesh (and below the first screen mesh) and into small on-size particles (3aS) below the mesh size of the third screen mesh (3d2) (and above the mesh size of the second screen mesh (3d2)). The exit for large on-size particles (3aL) and the exit for small one-size particles (3aS) are connected with the first splitter (5a), dividing the granule stream of large on-size particles (3aL) and/or small one-size particles (3aS) between the post processing unit (22) and a second splitter (5b) connected with the fluid-bed granulator (1). The exit for the undersized particles (3c) is connected to the second splitter (5b) and the exit for oversized particles (3b) is connected to the second splitter (5b) via the crusher (4). The second splitter (5b) collects and selects the ingoing streams from the before mentioned first splitter (5a) and the exits for undersized particles (3c) and crushed oversized particles (3b) for a further conveying into the fluid-bed granulator (1) via the recycle inlets (16). The particle stream leaving the second splitter is conveyed to different growing zones (7a1, 7a2, 7ai, with i=3, 4, 5, 6, . . . ) and/or different cooling zones (7b1, 7b2, 7bi, with i=3, 4, 5, 6, . . . ) via valves (5b1, 5b2,

5b3, 5b4, 5bi with i=3, 4, 5, 6, . . . ). Alternatively, or additionally, the crusher (4) can be directly connected with the first growing zone (7a1) via the corresponding valve (5b1). This connection is indicated by the dotted line. The processing and control unit (23) controls both the first splitter (5a) and the second splitter (5b) based on the product granules size or pre-cooled product granules size (after leaving the first cooler) provided by the particle size analyzer (24). The above described setup allows an automated adjustment of the seed particles provides by the second splitter (5b). If the product granules size increases, the second splitter (5b) can provide more undersized particles (3c) or crushed oversized particles (3b). If the product granules size decreases, the second splitter (5b) provides large on-size particles (3aL) and/or small on-size particles (3aS) via the first splitter (5a). This seed particle provision can be fully automated and controlled.

Figure 4:
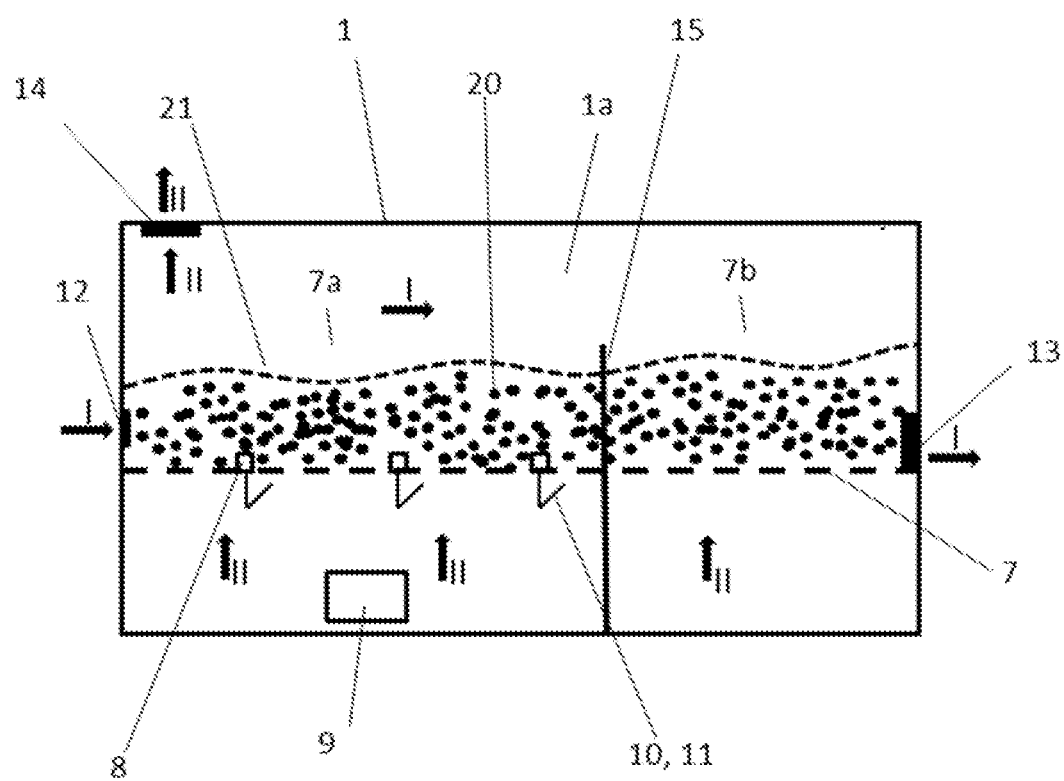
FIG. 4 is a schematic view of a fluid-bed granulator.

FIG. 4 shows the schematic view of the fluid-bed granulator system according to the invention comprising a fluid bed granulator (1) with a granulator space (1a) inside the fluid-bed granulator (1). A perforated plate (7) is located inside the granulator space (1a). Spray nozzles (8) are located on or above the perforated plate (7), a fluidization air inlet (9) is located below the perforated plate (2). Multiple supply lines for atomization air (10) and supply lines for a liquid melt (11) are connected to the spray nozzles (8). Optionally, these supply lines (10, 11) can be combined in one line. The fluid-bed granulator (1) further comprises a granulation seeds inlet (12), preferably in connection with a not shown product sieve or crusher, a granulator outlet opening (13) and an air vent opening (14). The fluid-bed (21) is formed by the corresponding granular particles (20) utilizing the fluidization air from below the perforated plate (7). The fluidization air flow is indicated by arrows labeled (II), the flow direction of the fluid bed granular particles (20) is indicated by arrows labeled (I). The fluid-bed (21) is preferably divided by one or more partition plates (15).

FIG. 5 shows an experimental particle size distribution diagram. The data were obtained in a granulation plant with a granulation setup according to FIG. 1 (sample numbers 1 to 13) and granulation setup according to FIG. 2 (sample numbers 14 to 35). The samples (Sample number) were collected once a day. The bold line (━) shows on-size particles (3a) with a medium particle size between 2 to 4 mm. The first dotted line (----) shows undersized particles (3c) with a medium particle size below 2 mm. The second dotted line (▪▪▪▪) shows oversized particles (3b) with a medium particle size above 4 mm. The first sample numbers show a significant variation in the particle size distribution. This fluctuation of the different particle size distribution can be significantly reduced by switching to a fluid-bed granulator system according to FIG. 2. The advanced process control (APC) described in FIG. 2 is applied and activated in the samples 14 to 35. The product size of the on-size particles (3a) within the range of 2 mm to 4 mm stabilizes at a high value.

Figure 6:
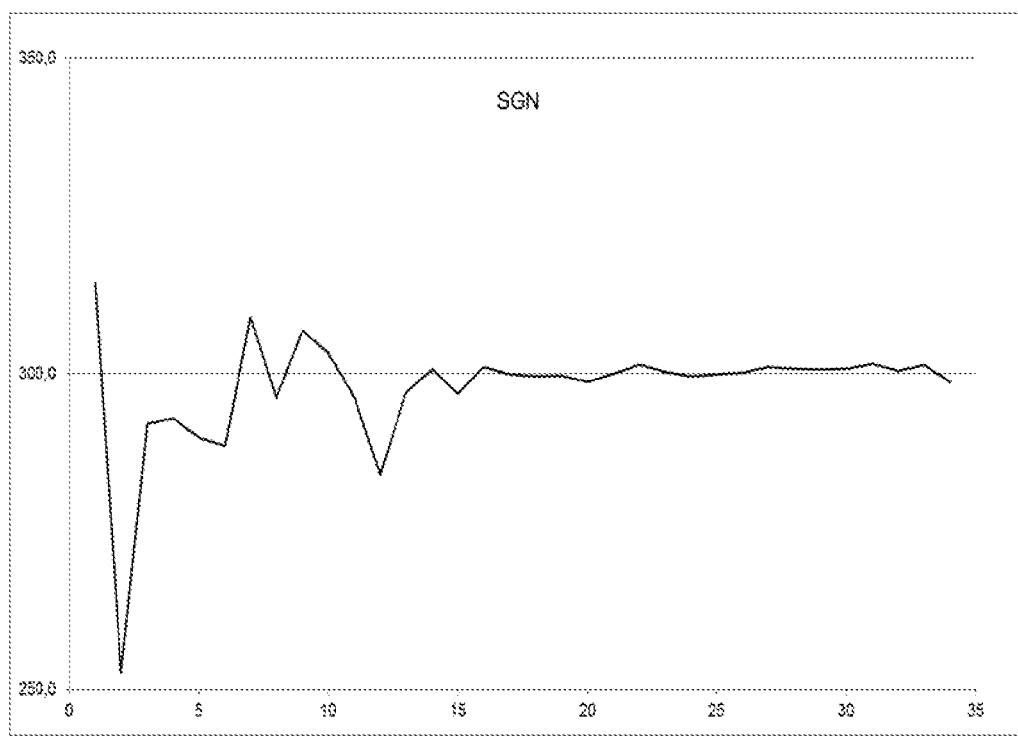
FIG. 6 is a diagram of a further experimental particle size distribution of the size guide number (SGN).

FIG. 6 shows a further experimental particle size distribution diagram of the size guide number (SGN) (y-axis) versus the sample number (x-axis). The SGN corresponds to the on-size particle (3a) size in mm multiplied with hundred. The experimental setup and the corresponding data are identical with FIG. 5. The conventional setup according to FIG. 1 shows a significant particle size fluctuation in the samples 1 to 14. By switching to the experimental setup of FIG. 2 at sample number 14, the fluctuations dampen, resulting in a very "monodisperse" particle size distribution.

Thereby, the inventive setup increases the number of on-size particles and significantly dampens the particle size fluctuations. The reduced fluctuations minimize the need for further manual process interventions, lowering the process cost by minimizing the amount of particles outside the product specification.

REFERENCE SIGNS (1) fluid-bed granulator
(1a) granulator space
(2) first cooler
(3) product screen
(3aL) large (final product) on-size particles
(3aS) small (final product) on-size particles
(3b) oversized particles
(3c) undersized particles
(3d) crushed particles
(3d1) first screen mesh
(3d2) second screen mesh
(3d3) third screen mesh
(5a) first splitter
(5b) second splitter
(5b1) valve
(5b2) valve
(5b3) valve
(5b4) valve
(7) perforated plate
(7a) growing zone
(7b) cooling zone
(8) spray nozzles
(9) fluidization air inlet
(10) supply lines for atomization air
(11) supply lines for a liquid melt
(12) granulation seeds inlet
(13) granulator outlet opening
(14) air vent opening
(15) partition plates
(16) recycle inlet
(20) granular particles
(21) fluid-bed
(22) post processing units
(23) processing and control unit
(24) particle size analyzer

What is claimed is:

1. A fluid-bed granulator system for producing fertilizer granules with a defined size, comprising:
    a fluid-bed granulator,
    a first cooler externally connected to the fluid-bed granulator or forming an internal part of the fluid-bed granulator,
    a product screen connected to the first cooler wherein the product screen comprises:
        an exit for on-size particles,
        an exit for oversized particles, and
        an exit for undersized particles;
    wherein the exit for undersized particles is connected to the fluid-bed granulator and wherein the exit for oversized particles is connected to the fluid-bed granulator via one or more crushers;
    wherein the exit for on-size particles is connected to a first splitter and wherein the first splitter is connected to the fluid-bed granulator and a post processing unit; and
    a particle size analyzer located between the fluid-bed granulator and the product screen;
    wherein the fluid-bed granulator comprises spray nozzles above a perforated plate, a fluidization air inlet located below the perforated plate, a granulation seeds inlet, a granulator outlet opening, an air vent opening, and partition plates that divide the fluid-bed granulator.

2. The fluid-bed granulator system of claim 1 wherein the product screen comprises an exit for large on-size particles and an exit for small on-size particles.

3. The fluid-bed granulator system of claim 2 wherein the product screen comprises three inner screen meshes, the three inner screen meshes having corresponding decreasing mesh sizes.

4. The fluid-bed granulator system of claim 3 wherein the mesh sizes of the inner screen meshes is in the range of 0.1 mm to 10 mm.

5. The fluid-bed granulator system of claim 1 wherein the first splitter; the exit for oversized particles via the crusher; and/or the exit for undersized particles are ingoing connected with a second splitter, wherein an output of the second splitter is connected to recycle inlets of the fluid-bed granulator.

6. The fluid-bed granulator system of claim 5 wherein the particle size analyzer is electronically connected to the first splitter and/or the second splitter.

7. The fluid-bed granulator system of claim 6 wherein the particle size analyzer is electronically connected to the first splitter and/or the second splitter via a processing and control unit.

8. The fluid-bed granulator system of claim 5 wherein the fluid-bed granulator comprises a perforated plate and wherein the perforated plate comprises, in the direction of flow, a first growing zone and a first cooling zone, a second growing zone and a second cooling zone.

9. The fluid-bed granulator system of claim 5 wherein the fluid-bed granulator comprises a perforated plate and wherein the perforated plate comprises, in the direction of flow, a growing zone and a cooling zone.

10. The fluid-bed granulator system of claim 9 wherein the first splitter and/or the second splitter are connected to the growing zone and/or the cooling zone via recycle inlets.

11. The fluid-bed granulator system of claim 9 wherein the first splitter and/or the second splitter are connected to the first growing zone and/or the second growing zone via the recycle inlets.

12. The fluid-bed granulator system of claim 7 wherein the first splitter and/or the second splitter are electronically connected to the processing and control unit and wherein the processing and control unit is electronically connected to the particle size analyzer.

13. The fluid-bed granulator system of claim 5 wherein the second splitter is connected to the first splitter; and/or
the exit for oversized particles via the crusher; and/or
the exit for undersized particles; and
wherein the second splitter is connected to the recycle inlets of the fluid-bed granulator and wherein the recycle inlets are connected to one or more growing zones and/or cooling zone.

14. The fluid-bed granulator system of claim 5 wherein the product screen comprises four inner screen meshes with a decreasing mesh size or five inner screen meshes with a decreasing mesh size.

15. The fluid-bed granulator system of claim 14 wherein the product screen is connected to:
a third splitter and a fourth splitter connected to the fluid-bed granulator and the post processing unit; and
wherein the third splitter and the fourth splitter are controlled via a processing and control unit.

16. The fluid-bed granulator system of claim 1 wherein the product screen comprises an exit for large on-size particles and an exit for small on-size particles, wherein the exit for large on-size particles and the exit for small on-size particles are connected with the first splitter for dividing the large on-size particles and the small on-size particles between the post processing unit and a second splitter that is connected with the fluid-bed granulator.

17. The fluid-bed granulator system of claim 1 comprising:
a second splitter that feeds recycled particles to the fluid-bed granulator;
a first growing zone, a first cooling zone, a second growing zone, and a second cooling zone; and
valves that are configured to convey the recycled particles leaving the second splitter to the first growing zone, the first cooling zone, the second growing zone, and the second cooling zone.

18. The fluid-bed granulator system of claim 17 wherein the crusher is directly connected with the first growing zone.

19. A urea granulation plant comprising the fluid-bed granulator system of claim 1.

20. A fluid-bed granulator system for producing fertilizer granules with a defined size, comprising:
a fluid-bed granulator,
a first cooler externally connected to the fluid-bed granulator or forming an internal part of the fluid-bed granulator,
a product screen connected to the first cooler wherein the product screen comprises:
an exit for on-size particles,
an exit for oversized particles, and
an exit for undersized particles;
wherein the exit for undersized particles is connected to the fluid-bed granulator and wherein the exit for oversized particles is connected to the fluid-bed granulator via one or more crushers;
wherein the exit for on-size particles is connected to a first splitter and wherein the first splitter is connected to the fluid-bed granulator and a post processing unit; and
a particle size analyzer located between the fluid-bed granulator and the product screen;
wherein the first splitter; the exit for oversized particles via the crusher; and/or the exit for undersized particles are ingoing connected with a second splitter, wherein an output of the second splitter is connected to recycle inlets of the fluid-bed granulator.

21. A fluid-bed granulator system for producing fertilizer granules with a defined size, comprising:
a fluid-bed granulator,
a first cooler externally connected to the fluid-bed granulator or forming an internal part of the fluid-bed granulator,
a product screen connected to the first cooler wherein the product screen comprises:
an exit for on-size particles,
an exit for oversized particles, and
an exit for undersized particles;
wherein the exit for undersized particles is connected to the fluid-bed granulator and wherein the exit for oversized particles is connected to the fluid-bed granulator via one or more crushers;
wherein the exit for on-size particles is connected to a first splitter and wherein the first splitter is connected to the fluid-bed granulator and a post processing unit; and
a particle size analyzer located between the fluid-bed granulator and the product screen;
a second splitter that feeds recycled particles to the fluid-bed granulator;

a first growing zone, a first cooling zone, a second growing zone, and a second cooling zone; and valves that are configured to convey the recycled particles leaving the second splitter to the first growing zone, the first cooling zone, the second growing zone, and the second cooling zone.

\* \* \* \* \*